Patented Oct. 6, 1936

2,056,473

UNITED STATES PATENT OFFICE 2,056,473

ANTHRAQUINONE DERIVATIVES AND PROCESS OF MAKING THE SAME

Frank Lodge and Colin Henry Lumsden, Blackley, Manchester, England, assignors to Imperial Chemical Industries Limited, a corporation of Great Britain No Drawing. Application January 13, 1933, Serial No. 651,624. In Great Britain January 29, 1932

14 Claims. (Cl. 260—60)

This invention relates to the production of new compounds of the anthraquinone series. More particularly, this invention deals with amino-anthraquinone-bis(thioglycollic) acids of the general formula

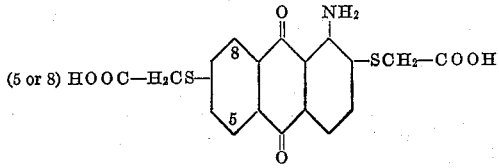

salts of these, and the lactams derivable from either by treatment with hot dilute acids. These compounds are useful as intermediates for dyestuffs.

According to this invention, new thioglycollic acid derivatives, more particularly, 1-amino-2,5-bis(thioglycollic) acid and 1-amino-2,8-bis(thioglycollic) acid may be obtained by reacting 1-amino-2,5- or 2,8-dimercapto-anthraquinone respectively (or their corresponding alkali-metal salts) with a halogen-acetic acid, such as chloroacetic acid or a water soluble salt thereof. These amino-di(thioglycollic) acids, in turn, when treated with hot dilute mineral acids, yield a lactam based on the amino group and the adjacent thioglycollic acid group.

The initial amino-dimercaptans may be prepared by reacting upon 1-amino-anthraquinone-5- or 8-sulphonic acid (as the case may be, or an alkali-metal salt thereof) with hot alkali sulphide. Alternatively, they may be prepared by treating a 1-halogen-, for instance, 1-chloro-5- or 8-nitro-anthraquinone (as the case may be) with hot alcoholic alkali-hydrogen sulphide. In the latter case the alkali-hydrogen sulphide appears to effect three reactions; namely, reduction of the nitro group, replacement of the halogen atom by a mercapto group, and introduction of a mercapto group in position ortho to the amine.

The invention is illustrated, but not limited by the following examples, in which the parts are by weight.

Example 1

100 parts of sodium-1-amino-anthraquinone-5-sulphonate are added, with stirring, to 2000 parts of sodium sulphide crystals at 90–100° C., and the mixture is heated to 140° C. in three hours, water vapor being allowed to escape. A reflux condenser is attached at 140° C. and the heating is continued at 140° C. for 5 hours.

The melt is allowed to cool a little and is then dissolved in 4000 parts of water. To the blue-violet solution obtained 400 parts of salt are added to precipitate the mercaptans as sodium salt. The sodium salt is filtered off, washed with 15% brine until clean, and preferably kept as a paste.

The so-obtained sodium salt of the mercaptan dissolved in warm water to a blue-violet solution and on addition of an excess (over one mol.) of aqueous sodium chloro-acetate and warming to 90° C. a bright red solution of the sodium salt of 1-amino-anthraquinone-2,5-bis(thioglycollic) acid is obtained. By adding an excess (over one mol.) of aqueous hydrochloric acid to this solution and boiling for ¼ hour, an orange suspension of the lactam anthraquinone-thioglycollic acid is obtained.

This compound which presumably has the formula

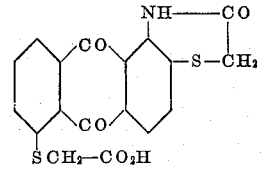

crystallizes in orange scales from nitrobenzene. It dissolves in alkalis to give orange or red solutions and in concentrated sulphuric acid to a blue red solution, the colors of which become olive brown when formaldehyde is added.

Example 2

When sodium 1-amino-anthraquinone-8-sulphonic acid is used instead of the 1,5-isomeride of Example 1, there is obtained a violet, finely crystalline paste of the sodium salt of 1-amino-anthraquinone-2,8-dimercaptan. This compound dissolves in warm water to a violet solution and is converted by treatment with sodium chloroacetate into 1-amino-anthraquinone-2,8-bis(thioglycollic) acid.

1-amino-anthraquinone-2,8-bis(thioglycollic) acid is converted by boiling with dilute hydrochloric acid into the lactam thioglycollic acid of the presumed formula

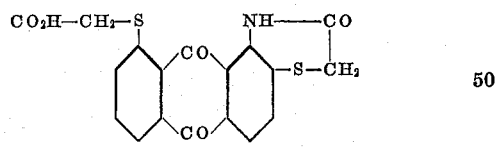

which resembles in properties its isomeride described above, but gives a red-violet solution in concentrated sulphuric acid, which becomes brown when formaldehyde (paraformaldehyde) is added.

*Example 3*

30 parts of 1-chloro-5-nitro-anthraquinone, 125 parts of 30% aqueous solution of sodium hydrogen sulphide, and 300 parts of industrial methylated spirits, are mixed together and heated in a closed vessel with stirring at 110–115° C. for six hours. The mixture is cooled and acidified by adding hydrochloric acid. The 1-amino-2,5-dimercapto-anthraquinone (identical with the product of Example 1) is filtered off and washed. It is a brownish-red compound which readily dissolves in dilute aqueous caustic soda to give a blue-violet solution. Upon treatment with chloroacetic acid or a salt thereof, in the manner described in Example 1, it yields 1-amino-anthraquinone-2,5-dithioglycollic acid, as described in Example 1.

It will be understood that many variations and modifications are possible in our preferred procedure, without departing from the spirit of this invention.

We claim:

1. 1-amino-anthraquinone-2-thioglycollic acid, containing a further thioglycollic acid group in one of the positions 5 and 8.

2. A compound of the group consisting of 1-amino-anthraquinone-2,5-dithioglycollic acid, its alkali-metal salts, and lactams.

3. A compound of the group consisting of 1-amino-anthraquinone-2,8-dithioglycollic acids, its alkali-metal salts and lactams.

4. An anthraquinone lactam which in the form of its free acid corresponds to the formula

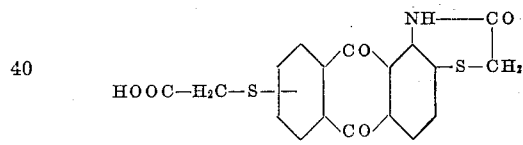

wherein the second thioglycollic acid group is in one of the positions 5 and 8.

5. The process of producing anthraquinone derivatives which comprises reacting upon a compound of the group consisting of 1-amino-anthraquinone-2,5-dimercaptan, 1-amino-anthraquinone-2,8-dimercaptan, and water soluble salts of these, with a compound of the class consisting of a halogen acetic acid and a water soluble salt thereof.

6. The process of producing an anthraquinone derivative which comprises reacting upon the sodium salt of 1-amino-anthraquinone-2,5-dimercaptan with an excess of aqueous sodium chloro-acetate.

7. The process of producing an anthraquinone derivative which comprises reacting upon the sodium salt of 1-amino-anthraquinone-2,8-dimercaptan with an excess of aqueous sodium chloro-acetate.

8. The process of producing anthraquinone derivatives which comprises reacting upon a compound of the group consisting of 1-amino-anthraquinone-2,5-dimercaptan, 1-amino-anthraquinone-2,8-dimercaptan, and water-soluble salts of these, with a halogen acetic acid or a water-soluble salt thereof, and reacting upon the product with hot dilute acid to form the corresponding lactam.

9. The process of producing an anthraquinone derivative which comprises reacting upon the sodium salt of 1-amino-anthraquinone-2,5-dimercaptan with an excess of aqueous sodium chloro-acetate, acidifying the reaction mixture, and heating the same to precipitate the lactam of 1-amino-anthraquinone-2,5-di(thioglycollic) acid.

10. The process of producing an anthraquinone derivative which comprises reacting upon the sodium salt of 1-amino-anthraquinone-2,8-dimercaptan with an excess of aqueous sodium chloro-acetate, acidifying the reaction mixture, and heating the same to precipitate the lactam of 1-amino-anthraquinone-2,8-di(thioglycollic) acid.

11. A compound of the group consisting of 1-amino-anthraquinone-2,5-dimercaptan, 1-amino-anthraquinone-2,8-dimercaptan, and their alkali-metal salts.

12. The process of producing 1-amino-2,$x$-dimercaptan, wherein $x$ stands for 5 or 8, which comprises reacting upon 1-amino-$x$-sulpho-anthraquinone, $x$ having the same significance as above, with hot alkali-sulphide.

13. The process of producing 1-amino-2,$x$-dimercaptan, wherein $x$ stands for 5 or 8, which comprises reacting upon 1-halogen-$x$-nitro-anthraquinone, $x$ having the same significance as above, with hot alcoholic alkali-hydrogen sulphide.

14. A compound of the class consisting of anthraquinone thioglycollic acids of the formula

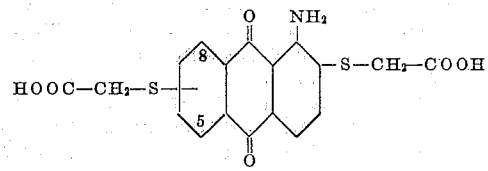

wherein the second thioglycollic acid group is in one of the positions 5 and 8, their alkali metal salts and lactams.

FRANK LODGE.
COLIN HENRY LUMSDEN.